United States Patent [19]

Dietrick et al.

[11] Patent Number: 5,000,846
[45] Date of Patent: Mar. 19, 1991

[54] SLOTTED FILTER PLATE WITH HOOK ATTACHMENT

[75] Inventors: Gerald P. Dietrick; Michael J. Vagedes, both of Boone County, Ky.

[73] Assignee: Venture Production Company, Walton, Ky.

[21] Appl. No.: 354,487

[22] Filed: May 19, 1989

[51] Int. Cl.$^5$ ............................................. B01D 29/41
[52] U.S. Cl. ................................. 210/232; 210/323.1; 210/346; 210/487
[58] Field of Search .................... 210/232, 323.1, 346, 210/347, 461, 462, 486, 498

[56] References Cited

U.S. PATENT DOCUMENTS

| | | | |
|---|---|---|---|
| 2,443,087 | 6/1948 | Ulrich | 210/461 |
| 2,821,305 | 1/1958 | Anderson | 210/461 |
| 3,659,718 | 5/1972 | Braciner et al. | 210/486 |
| 4,307,503 | 12/1981 | Auld et al. | 210/486 |
| 4,608,164 | 8/1986 | Neu | 210/232 |
| 4,776,958 | 10/1988 | Stephenson | 210/461 |
| 4,789,474 | 12/1988 | Gaudfir | 210/346 |

Primary Examiner—Robert A. Dawson
Assistant Examiner—Wanda L. Millard
Attorney, Agent, or Firm—Roy F. Schaeperklaus

[57] ABSTRACT

A filter screen assembly for removing particulate material from a slurry. The assembly includes filter media for accumulating particulate of larger than predetermined size as filter cake exteriorly of plates having a plurality of slots therein. A hook member along an edge of each of the plates engages a tubular distributor having slots therealong. Each of the slots of the tubular distributor receives the hook member of one of the plates so that the plates are mounted on the tubular distributor. Other edges of the plates are connected to form chamber means therebetween. The chamber means communicates with the interior of the tubular distributor. A reduced pressure is impressed on the interior of the tubular distributor to cause liquid of the slurry to be drawn through the slots in the plates so that the particular material collects on the outside of the plates.

10 Claims, 9 Drawing Sheets

SLOTTED FILTER PLATE WITH HOOK ATTACHMENT

BACKGROUND OF THE INVENTION

This invention relates to a filter screen assembly for separating particulate material from a slurry in which the particulate material is contained.

An object of this invention is to provide such a filter screen assembly in which a large area of filter screen is provided in a small volume.

Another object of this invention is to provide for such a filter screen assembly, a filter screen unit which is of simple structure, die moldable, durable, strong, inexpensive, easy to assemble, clean and replace, and which resists clogging away from the filter surface.

A further object of this invention is to provide for such a filter screen assembly, a slurry filter screen unit which separates particulate matter from the filtrate at the outer surface of the filter unit from which the particulate may be scraped or otherwise readily removed from the exterior of the filter unit.

Another object of this invention is to provide a slurry filter screen unit having oppositely faced parallel filter faces, each having spacing support means projecting toward the other so that inward forces applied to the filter faces are mechanically transferred to the opposite face to substantially offset inwardly directed forces applied to one face to the inwardly directed forces applied to the exterior of the opposite face of the filter.

Another object of this invention is to provide such a filter screen unit with a filter media web overlying the filter faces and adapted to filter from the slurry passing through the media all particles larger than a predetermined size which would otherwise pass through the filter faces of the unit.

A further object of this invention is to provide a filter screen assembly having filter media of bag form overlying the filter faces of the unit and removable from the filter unit when desired.

Another object of this invention is to provide a filter screen assembly through which liquid may be drawn from a slurry to accumulate particulate matter from the slurry on the filter and discharging said liquid through a venturi to draw air through a second filter assembly to dry the filter cake previously accumulated on said second filter assembly.

A further object of this invention is to provide a filter system having at least two filter assemblies adapted to alternately filter particulate matter from liquid of a slurry drawn into one assembly and expelling said liquid through a venturi pump to draw air through the second filter assembly to dry filter cake accumulated on the filter faces thereof so that the filter cake may be more readily removed from the filter media.

BRIEF STATEMENT OF THE INVENTION

Briefly, this invention provides a filter screen assembly which includes a plurality of slotted plates and means for drawing a vacuum across the plates to draw liquid of a slurry through the slots of the plate while particulate material larger than a predetermined size is held on a face of the plate. Pairs of plates are assembled in overlying relation to form a space therebetween into which the slots discharge liquid. Pipe means is connected to the space. Vacuum impressing means connected to the pipe means supplies the vacuum to the space between the plates. A plurality of pairs of plates can be connected to a single pipe.

The above and other objects and features of the invention will be apparent to those skilled in the art from the following detailed description and the drawings.

DESCRIPTION OF PRESENTLY PREFERRED EMBODIMENT

Figure 1:
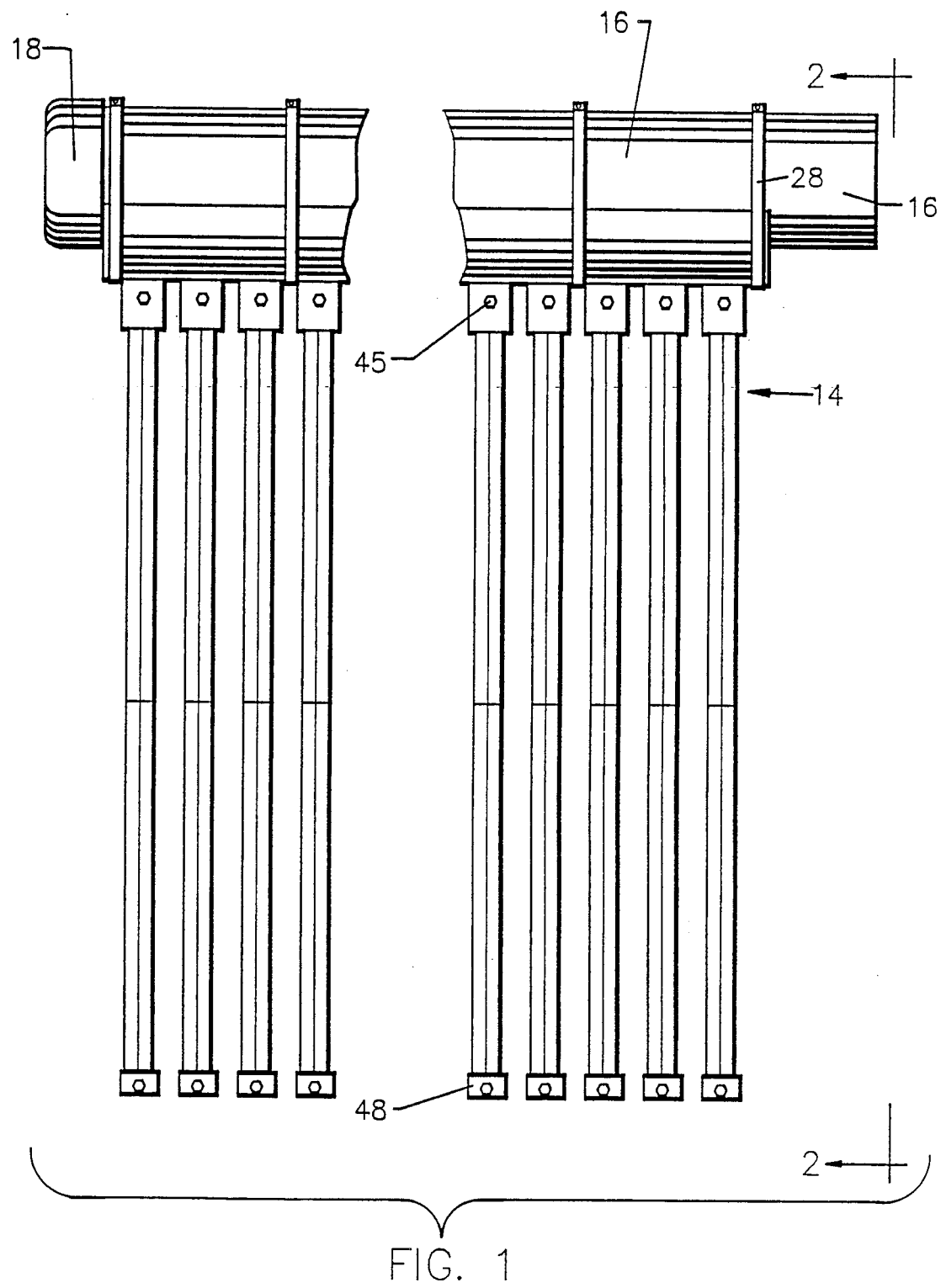
FIG. 1 is a somewhat schematic view in side elevation of a fragmentary portion of a filter screen assembly constructed in accordance with an embodiment of this invention.

In the following detailed description and the drawings, like reference characters indicate like parts.

Figure 2:
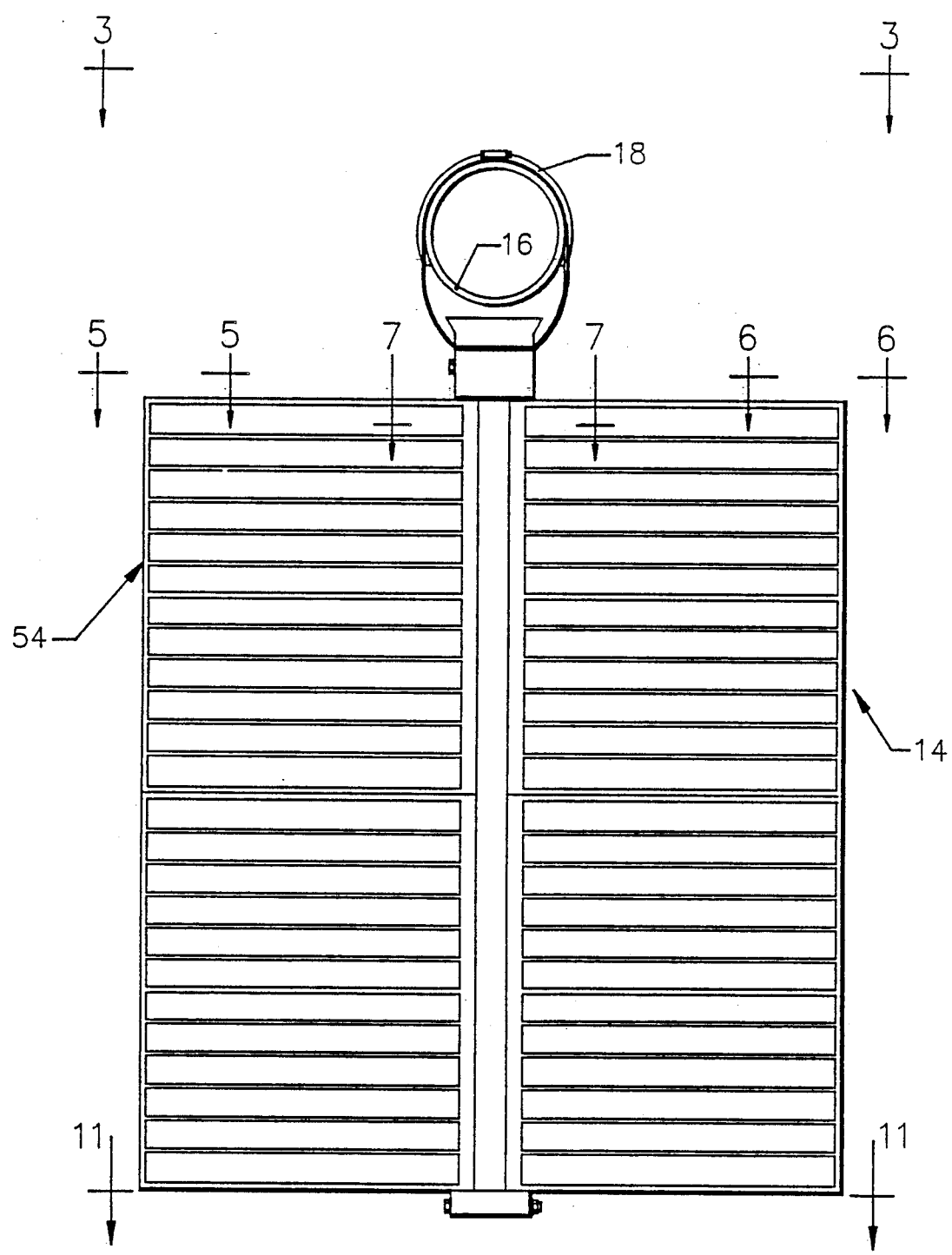
FIG. 2 is a somewhat schematic view in end elevation of the filter screen assembly looking in the direction of the arrows 2—2 in FIG. 1, four slotted plates of the assembly being shown.
Figure 3:
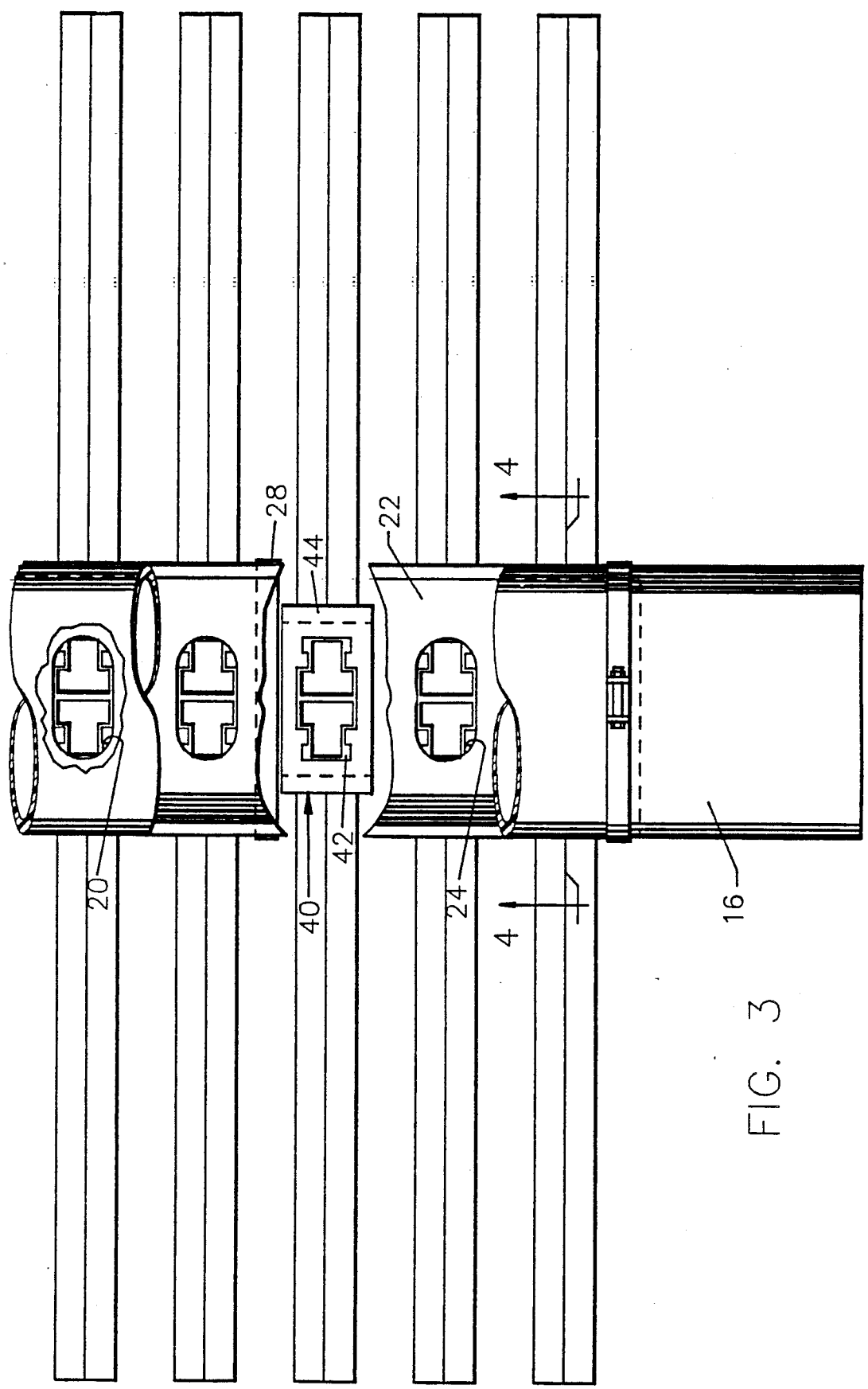
FIG. 3 is a fragmentary plan view of the filter screen assembly looking in the direction of the arrows 3—3 in FIG. 2.
Figure 4:
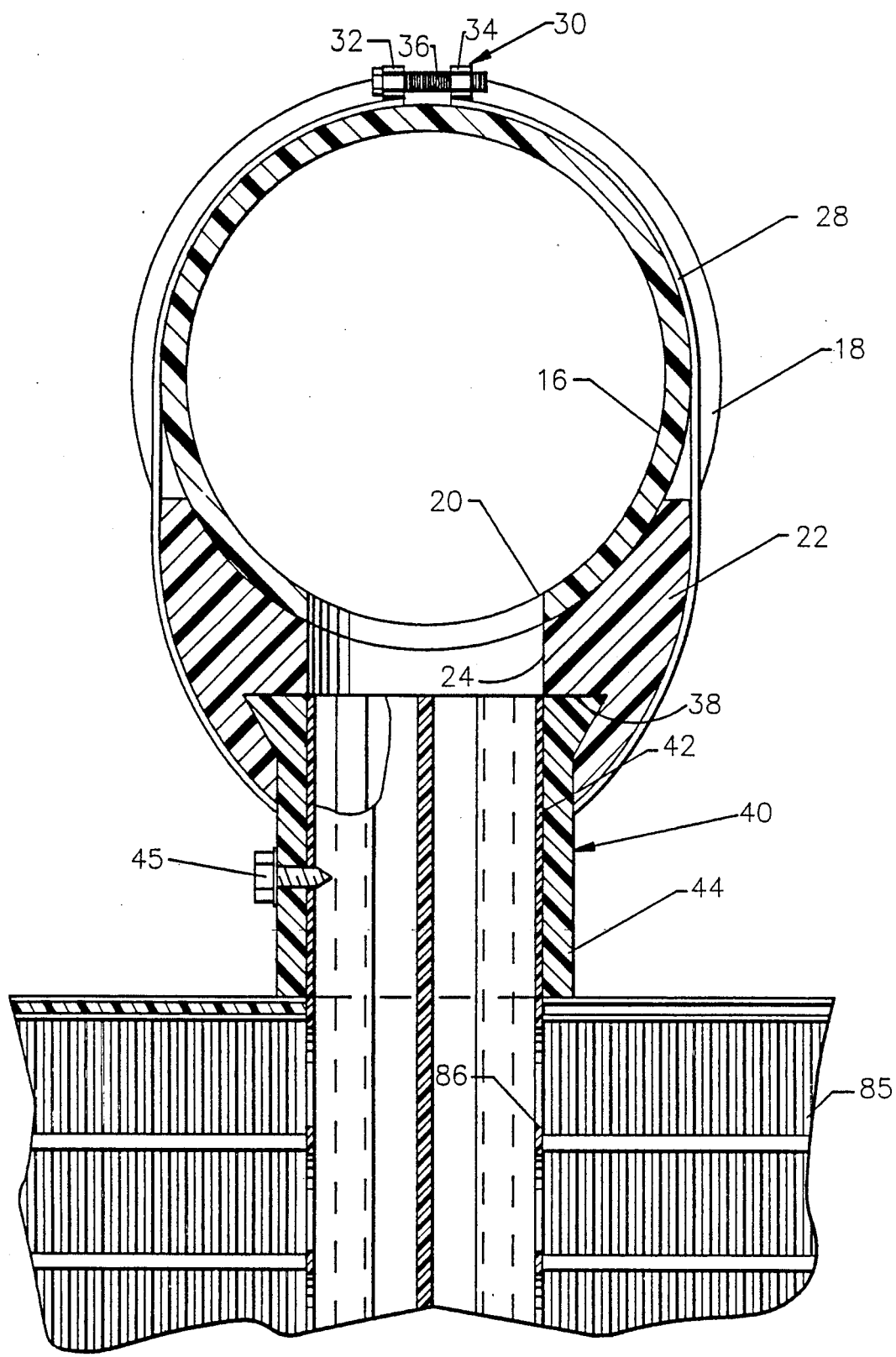
FIG. 4 is a view in section taken on the line 4—4 in FIG. 3, a portion of a tubular distributor being broken away to reveal structural details.

In FIGS. 1 and 2 is shown a filter screen assembly 14 which includes a main pipe 16. The main pipe is closed at one end by a cap 18. The main pipe 16 is provided with a series of elongated openings 20 (FIG. 4). A saddle member 22 is mounted on the main pipe 16 underlying the openings 20 of the main pipe 16. Elongated openings 24 in the saddle member 22 are aligned with the elongated openings 20 in the main pipe 16. The saddle member 22 and the main pipe 16 are held in assembled relation by straps 28. End portions of each of the straps are drawn together by a clamp assembly 30. The clamp assembly 30 includes fittings 32 and 34 mounted on opposite end portions of the strap 28 and a bolt member 36. The bolt member 36 is rotatably mounted in the fitting 32 and threaded in the fitting 34 so that turning of the bolt member 36 tightens and loosens the clamp assembly.

Figure 11:
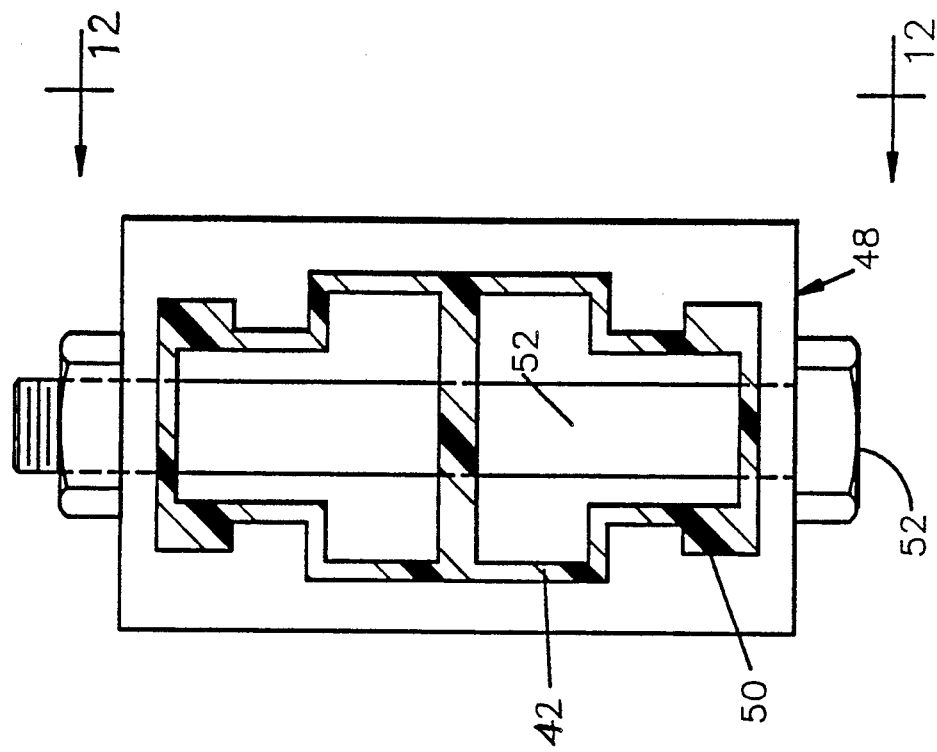
FIG. 11 is a view in section taken on the line 11—11 in FIG. 2.
Figure 12:
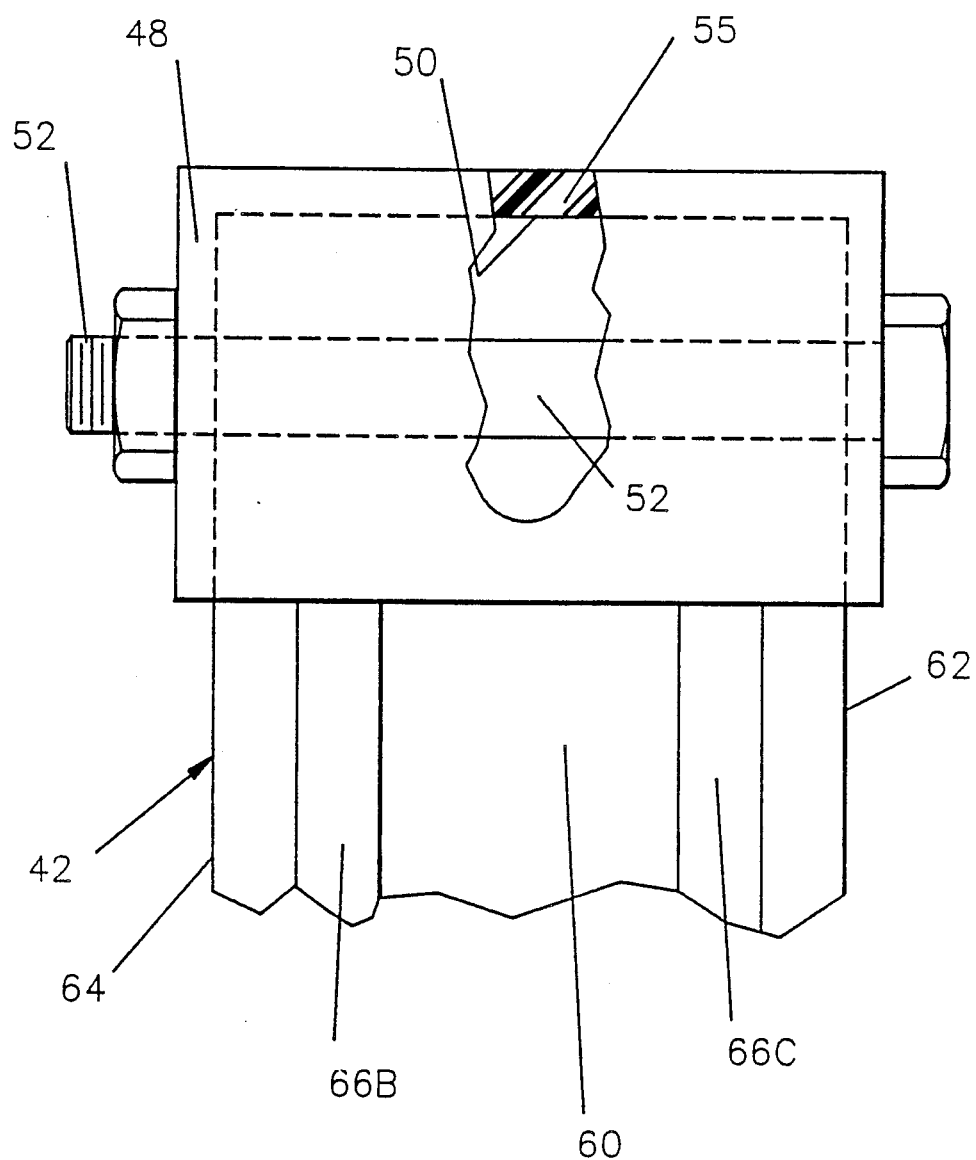
FIG. 12 is an elevational view looking in the direction of the arrows 12—12 in FIG. 11, plates being removed for clarity, a portion of a cap being broken away.

The elongated openings 24 in the saddle member 22 open into a dovetail slot 38 in the saddle member 22. The dovetail slot 38 receives tube assemblies 40. Each tube assembly 40 includes an upright tubular distributor 42 and a dovetail mount 44. The dovetail mount 44 is received in the dovetail slot 38 and is supported by the saddle member 22. An upper portion of the tubular distributor 42 is received in the dovetail mount 44 to be supported by the dovetail mount 44. A set screw 45 holds the tubular distributor 42 and the dovetail mount 44 in assembled relation. The lower end portions of bores 43 and 43A (FIG. 7) of the tubular distributor 42 are closed by a cap 48 (FIGS. 11 and 12). The cap 48 includes a well 50 which receives the lower end portion of the tubular distributor 42. A bolt 52 holds the cap 48 in place. The cap 48 closes the lower end of an associated tubular distributor 42 and supports slotted plates 54 mounted on the associated tubular distributor 42. A bottom wall 55 of the cap 48 closes lower ends of the bores 43 and 43A of the tubular distributor 42.

Figure 7:
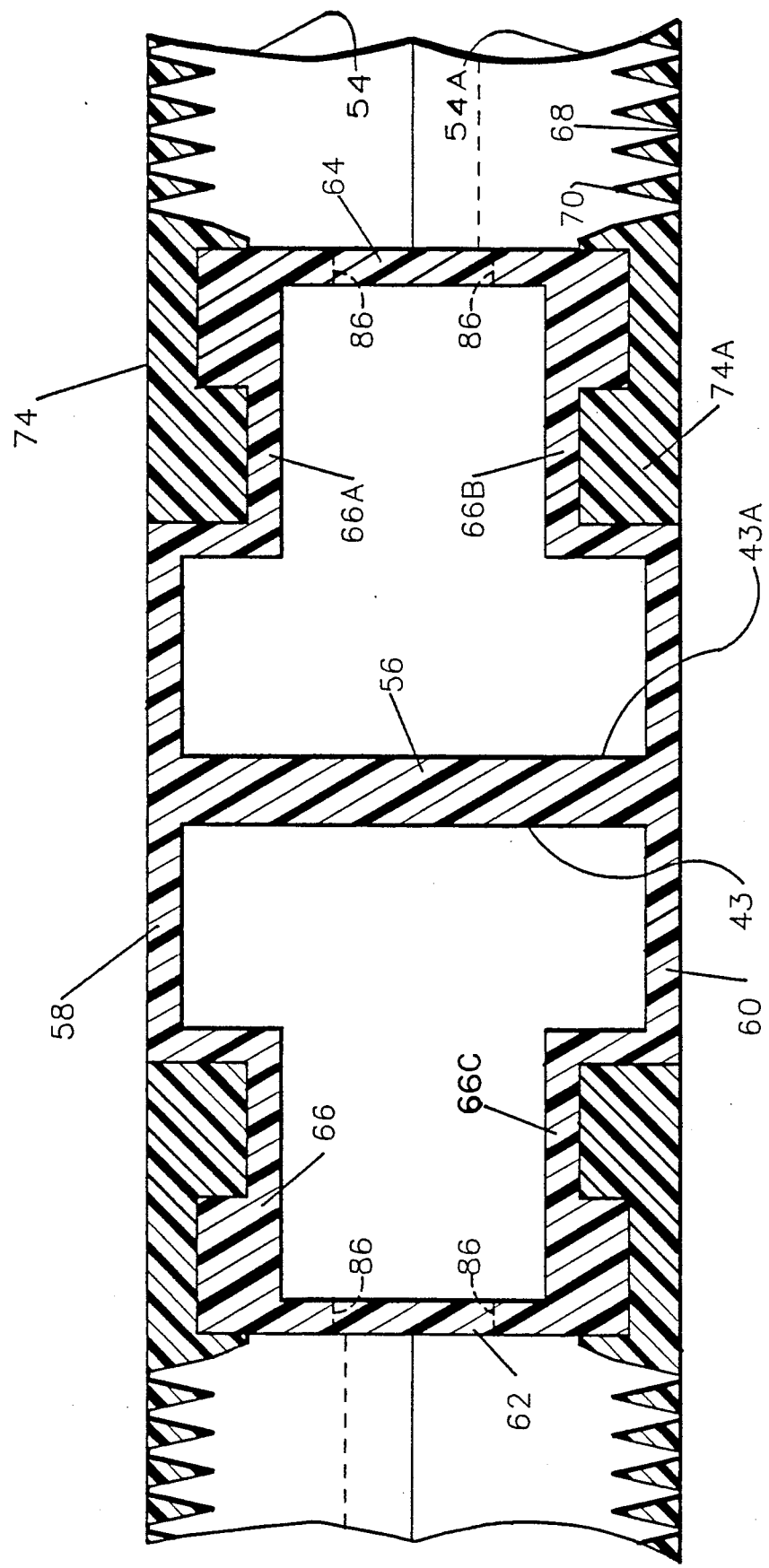
FIG. 7 is a view in section taken on the line 7—7 in FIG. 2.

The tubular distributor 42, as shown in FIG. 7, includes a central panel 56, side panels 58 and 60, and end panels 62 and 64. Between each side panel and associated end panels are socket portions 66, 66A, 66B and 66C.

Figure 9:
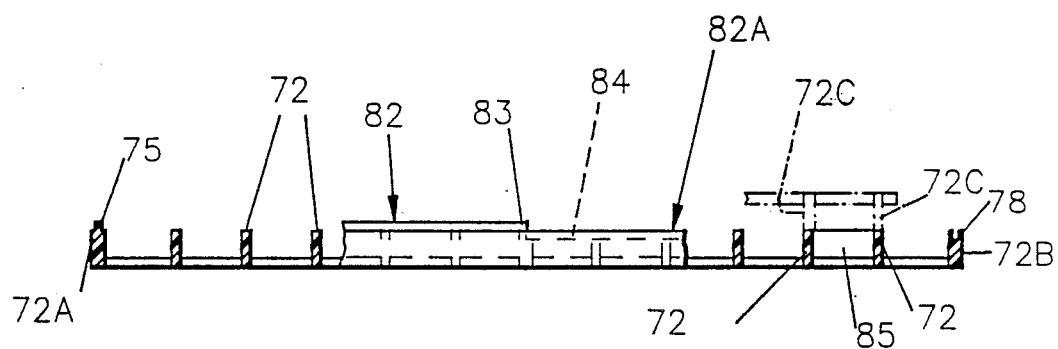
FIG. 9 is a view taken generally on the line 9—9 in FIG. 8, a fragmentary portion of a second plate being shown in dot-dash lines.
Figure 8:
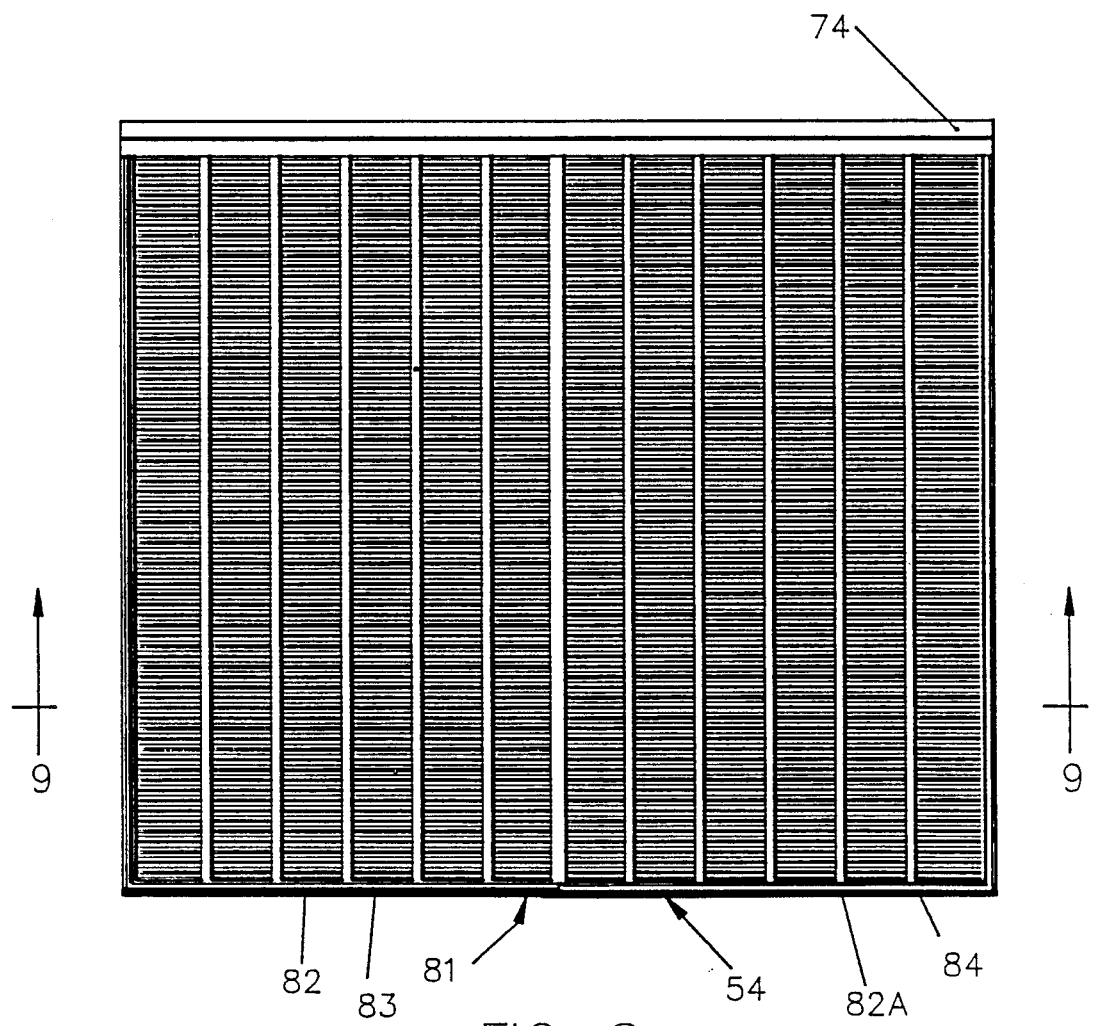
FIG. 8 is a view in side elevation of a plate unit of the filter screen assembly removed therefrom.
Figure 10:
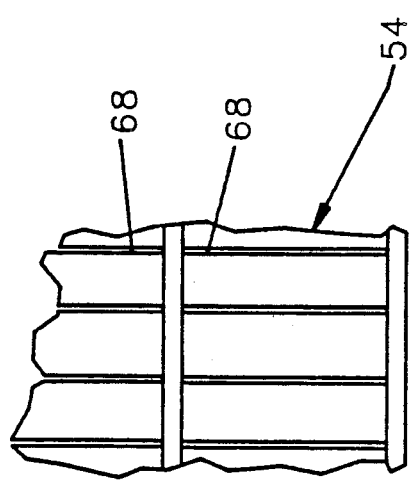
FIG. 10 is a fragmentary view looking in the direction of the arrows 10—10 in FIG. 6.

The slotted plate 54 can be a molding provided with numerous slots 68, as shown in FIG. 10. Adjacent slots are separated by prism-shaped dividers 70, which are triangular in cross section, and by separator bars 72. Along one edge of the slotted plate 54 is formed a hook-shaped flange 74. A pair of the slotted plates 54 and 54A is assembled as shown in FIG. 7 and is mounted with hook-shaped flanges 74 and 74A in socket portions 66A and 66B, respectively. An edge bar 72A, which is perpendicular to the hook-shaped flange 74, is provided with a tongue portion 75 as shown in FIG. 9. A second edge bar 72B is provided with a slot 78, and the tongue 75 of one slotted plate can fit into the slot 78 of the other slotted plate of the pair to hold edge bars 72A and 72B of the plates in alignment. A half portion 82 of a third edge bar 81 is provided with a tongue portion 83, and another half portion 82A of the third edge bar 81 is formed with a slot 84 so that edge bars of the plates of a pair are held in assembled relation. The separator bars 72 can be engageable with other separator bars 72C of the other slotted plate of a pair as shown in dot-dash lines in FIG. 9. The slotted plates can be attached together by appropriate adhesives, clamps, or by other fastening means (not shown) to form filter units 80 having slotted faces on opposite sides and opposed parallel tongues and grooves along one edge and half of another to cooperate with a tubular distributor 42. The separator bars 72 form chambers 85 (FIGS. 5, 6 and 9) between the slotted plates of a filter unit 80, and also cooperate to counter-balancingly transfer compressive loads from one slotted plate to the other plate of a filter unit.

Figure 5:
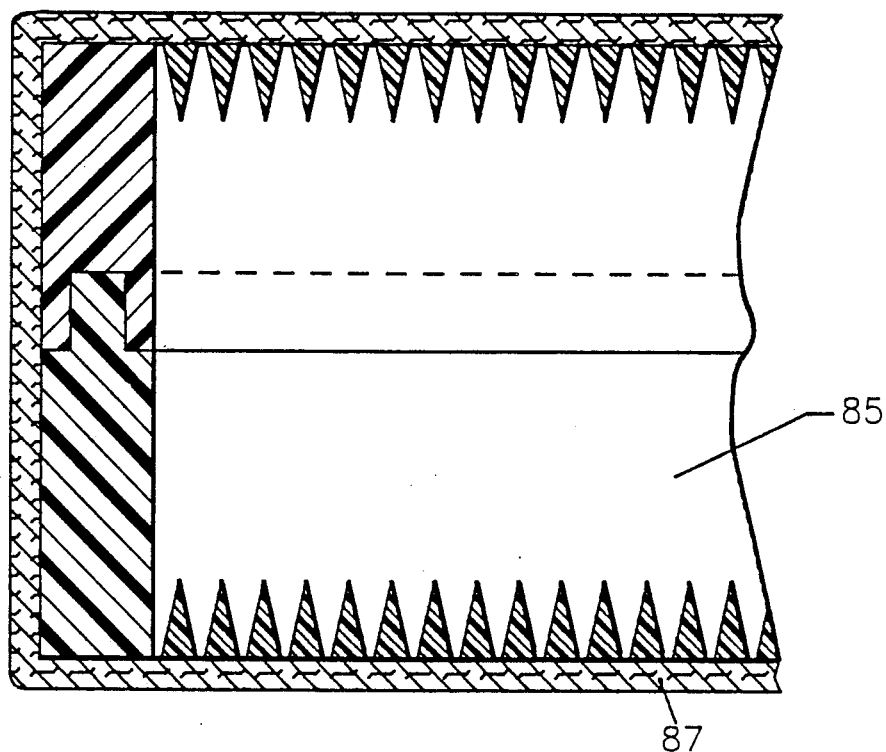
FIG. 5 is a view in section taken on the line 5—5 in FIG. 2.
Figure 6:
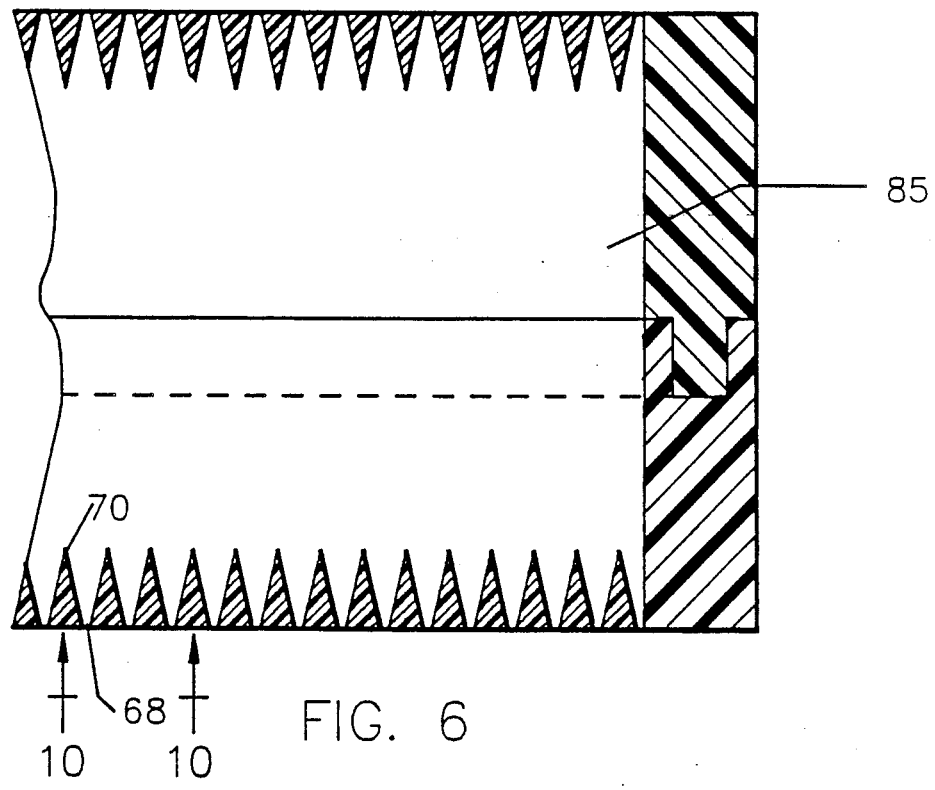
FIG. 6 is a view in section taken on the line 6—6 in FIG. 2.

Openings 86 can be formed in end walls of the tubular distributor 42 as shown in FIG. 4. The openings 86 can be formed when the assembly is being put together to provide communication between the chambers 85 and the bores 43,43A in the interior of the tubular distributor 42.

Where the minimum size of particles desired to be filtered from the slurry is larger than slurry particles which will pass through slots 68 in the slotted plates 54 of filter units 80, the filter units themselves may be the filter media of the filter screen assembly. However, it is often desired that much smaller size particles be filtered out of slurry liquid, and, in such a case, as shown in FIG. 5 a filter media web 87 may be provided in overlying relation to the slurry side of the slotted plate faces 54 of the filter units 80 of the filter screen assembly 14. The web of filter media 87 may be adhered to the slotted faces of the plates 54, or bags or envelopes which preferably snugly fit around the outer surface of a filter unit, or several thereof as are shown in mounted condition in FIG. 2. A reduced pressure can be impressed on the interior of the filter units to induce a flow of fluid successively through the filter media 87 and through the slotted surfaces of the filter units 80. The fluid flow tends to urge the filter media web 87 against the slotted surface of 54 and fluid flows through the slots while particles of a size greater than can pass through the filter media are trapped and accumulate as a filter cake on the outward face of the filter media web 87, if present, or, if it is absent, upon the slotted plate face of the unit 80.

Thus, if the filter screen assembly is to be used to filter particles which would otherwise pass through the slots 68, a filter media web of appropriate character is provided overlying the exterior of the slotted faces of the units.

The assembly can be immersed in liquid containing particulate material. A reduced pressure can be impressed on the main pipe 16. The liquid which has been drawn through filter media 87 where present, or where no such media is present, can directly enter through the slots 68 which widen inwardly, with particulate material being caught on the outside of the plates 54. The liquid travels along chambers 85 between the plates 54 and through the openings 86 in the tubular distributor 42 and up bores 43 and 43A of the tubular distributor 42 and through the openings 24 in the saddle member 22 and the openings 20 in the main pipe 16 to be discharged through the main pipe 16.

When sufficient liquid has been drawn through slots 68, or successively through a filter media 87 and then slots 68, so that a wet filter cake is accumulated on the exterior of the filter media 87, or in the absence thereof, on the exterior, outer surface, of the slotted plate 54 until the liquid flow volume is reduced to a point where the filter cake must be removed, that is, the assembly needs cleaning. The filter screen assembly can be raised from the liquid. Where there is no filter media 87 overlying the exterior surface of the unit, the accumulated particulate material on the outward sides of the plates can be removed as by scraping or washing. Where a filter media such as media 87 is present, it can be stripped off the units and replaced, or air can be drawn through the assembly until the filter cake accumulated on the media 87 is dried, and the dried cake may be brushed or otherwise removed from the media 87, or can be removed with the media 87 and then treated mechanically or otherwise to remove the dried filter cake. Of course, the media 87 may be removed and discarded if its condition is such that its useful life has been exhausted.

If it at such point appears desirable to also remove and replace one or more filter units 80, the end cap 48 is removed from the tubular distributor 40, the units to be replaced are slid lengthwise of and off the uncapped end of distributor 42, replacement units are then slid onto and lengthwise along and into place on the distributor, and the cap replaced.

The parts of the assembly can be held in position by appropriate adhesives or clamps.

The assembly illustrated in the drawings and described above is subject to structural modification without departing from the spirit and scope of the appended claims.

Having described our invention, what we claim as new and desire to secure by letters patent is:

1. A filter screen assembly for removing particulate material from a slurry which comprises a pair of filter plates each having a respective hook member along a first edge of the plate, a tubular distributor having slots therealong, each of the slots of the tubular distributor receiving the hook member of a respective one of the plates so that the plates are mounted on the tubular distributor, means for closing one end of the tubular distributor, each of the filter plates having a plurality of separator bars oriented transversely of the first edge thereof to cooperate with opposed separator bars of the other plate to effect offsetting transfer of compression forces on the plates, means for connecting other edges of the plates to form chambers therebetween extending toward the first edges of the plates, means forming a passageway communicating between each chamber and the interior of the tubular distributor, there being slots in the filter plates extending transversely of the chambers, and means for impressing a reduced pressure on the interior of the tubular distributor to cause liquid of the slurry to be drawn through the slots of the plates, the removed particulate material collecting on the outside of the plates.

2. A filter screen assembly comprising a filter unit in accordance with claim 1 having filter media mounted adjacent the exterior of the slotted faces of the filter plates to pre-filter all fluid flowing into the filter unit through slots in the slotted faces thereof, the filter media being urged against the slotted plate faces of the filter unit by fluid flowing therethrough.

3. A filter screen assembly comprising a filter unit in accordance with claim 1 wherein each filter plate is a plastic molding wherein the slots are separated by dividers which narrow toward the chambers.

4. A filter screen assembly for removing particulate material from a slurry which comprises a pair of filter plates each having a plurality of slots therein, a hook member along an edge of each of the plates, a tubular distributor having slots therealong, each of the slots of the tubular distributor receiving the hook member of one of the plates so that the plates are mounted on the tubular distributor, means for closing one end of the tubular distributor, means for connecting other edges of the plates to form chambers therebetween, means forming a passageway communicating between each chamber and the interior of the tubular distributor which includes a main pipe, a saddle member underlying the main pipe, means for attaching the saddle member to the main pipe, the saddle member and the main pipe having aligned openings, and means for attaching the saddle member and the main pipe to the tubular distributor at the openings in the saddle and in the main pipe, the openings in the saddle and in the main pipe being in communication with the interior of the tubular distributor, and means for impressing a reduced pressure on the interior of the tubular distributor to cause liquid of the slurry to be drawn through the slots of the plates, the particulate material collecting on the outside of the plates.

5. A filter screen assembly as in claim 4 in which the means for attaching the saddle member and the main pipe to the tubular distributor includes a dovetail mount, the saddle member having a dovetail slot receiving the dovetail mount, and means for attaching the tubular distributor to the dovetail mount.

6. A filter screen assembly as in claim 4 in which the means for attaching the saddle member to the main pipe includes a strap surrounding the main pipe and the saddle member and means for tightening the strap to hold the main pipe and the saddle in assembled relation.

7. A filter screen assembly for removing particulate material from a slurry which comprises a pair of filter plates each having a plurality of slots therein, a hook member along an edge of each of the plates, a tubular distributor having slots therealong, each of the slots of the tubular distributor receiving the hook member of one of the plates so that the plates are mounted on the tubular distributor, means for closing one end of the tubular distributor, means for connecting other edges of the plates to form chambers therebetween, means forming a passageway communicating between each chamber and the interior of the tubular distributor which includes a main pipe and means for connecting the main pipe to the tubular distributor with the main pipe in communication with the interior of the tubular distributor, and means for impressing a reduced pressure on the interior of the tubular distributor to cause liquid of the slurry to be drawn through the slots of the plates, the particulate material collecting on the outside of the plates.

8. For a filter screen assembly, a filter unit for removing particulate material from a slurry which comprises a pair of filter plates each having a plurality of slots therein, a hook member along one edge thereof, a tubular distributor having slots therealong, each of the slots of the tubular distributor receiving the hook member of one of the plates so that the plates are mounted on the tubular distributor, means for closing one end of the tubular distributor, each plate having flanges projecting from the other edges of the slotted plate and adapted to sealingly abut complementary flanges projecting from the other plate, means for connecting other edges of the plate to form a chamber therebetween, separator bars extending in a direction perpendicular to the edge of the plate having the hook member and parallel to the edge flanges extending from the ends of said hook shaped member edge, said separator bars extending to abut complementary separator bars of the second plate so that the cavity between the plates is divided into parallel chambers in communication adjacent the edge of the filter unit having the hook shaped members, means forming a passageway communicating between each chamber and the interior of the tubular distributor, and means for impressing a reduced pressure on the interior of the tubular distributor to cause liquid of the slurry to be drawn through the slots of the plates, the particulate material collecting on the outside of the plates, whereby compressive forces acting against the exterior surfaces of the slotted panel members are absorbed by the edge flanges and abutting separator bars which support the slotted faces in spaced substantially undistorted relation.

9. For a filter screen assembly, a filter unit for removing particulate material from a slurry which comprises a pair of filter plates each having a plurality of slots therein, a hook member along an edge of each of the plates, a tubular distributor having slots therealong, each of the slots of the tubular distributor receiving the hook member of one of the plates so that the plates are mounted on the tubular distributor, means for closing one end of the tubular distributor, means for connecting other edges of the plates to form chambers therebetween, means forming a passageway communicating between each chamber and the interior of the tubular distributor, the slots in the plate extend between respective separator bars and parallel to the edge of the plate having hook shaped members and are separated by dividers of prism shape section with a flat face in the plane of the slotted panel and projecting to an edge face in the cavity enclosed by the panels remote from the prism base, whereby the slots between the prism formed dividers widen from the face of the panel inwardly in the cavity surrounded by the panels, and means for impressing a reduced pressure on the interior of the tubular distributor to cause liquid of the slurry to be drawn through the slots of the plates, the particulate material collecting on the outside of the plates.

10. For a filter screen assembly, a filter unit which comprises a pair of filter plates each having a plurality of slots therein, filter media mounted adjacent the exterior of the slotted faces thereof to pre-filter all fluid flowing into the filter unit through slots in the slotted faces thereof, the filter media being urged against the slotted plate faces of the filter unit by fluid flowing therethrough, a hook member along an edge thereof for mounting engagement with the filter screen assembly, each plate having flanges projecting from the other edges of the slotted plate and adapted to sealingly abut complementary flanges projecting from the other plate, separator bars extending in a direction perpendicular to the edge of the plate having the hook member and parallel to the edge flanges extending from the ends of said hook shaped member edge, said separator bars extending to abut complementary separator bars of the second plate so that the cavity between the plates is divided into parallel chambers in communication adjacent the edge of the filter unit having the hook shaped members whereby compressive forces acting against the exterior surfaces of the slotted panel members are absorbed by the edge flanges and abutting separator bars which support the slotted faces in spaced substantially undistorted relation.

* * * * *